United States Patent Office 2,928,869
Patented Mar. 15, 1960

2,928,869

PURIFICATION OF GLUTAMINE

Elmer V. McCollum and Agatha A. Rider,
Baltimore, Md.

No Drawing. Application July 30, 1957
Serial No. 675,046

6 Claims. (Cl. 260—534)

This invention relates to the isolation of glutamine from mixtures containing it.

Glutamine is normally isolated in current practice by precipitating it from aqueous solution with mercuric nitrate. However, the amide group is readily hydrolyzed under aqueous conditions with attendant loss in yields.

Accordingly, it is an object of the present invention to isolate glutamine from mixtures containing it in increased yields.

Another object is to devise a method of isolating glutamine which substantially eliminates hydrolysis thereof.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that glutamine can be recovered in greatly purified form from beet juice, other plant juices and extracts of germinating seeds, etc. if the liquid composition is dried and then this dry mixture is taken up in a substantially anhydrous lower alkyl ketone containing a small amount of certain of relatively strong organic acid, especially trichloroacetic acid or an aromatic sulfonic acid. The organic acid should be one which forms an acetone soluble compound with glutamine. The organic acid-acetone solution is then treated with substantially anhydrous ammonia to precipitate the glutamine and accompanying amino acids. The precipitate is then washed with methanol containing calcium chloride. This dissolves the other amino acids and leaves behind a residue of glutamine. The glutamine can be further purified by recrystallization from an ethanol-water mixture in the manner set forth in Vickery and Pucher, "Biochem. Preparations" 1, 44 (1949).

While acetone is the preferred ketone, there can also be used other dialkyl ketones such as methyl ethyl ketone, methyl n-propyl ketone, diethyl ketone, hexanone-2, methyl t-butyl ketone, cyclohexanone, etc.

The preferred organic acid is trichloroacetic acid. However, there can also be used sulfonic acids, more especially aromatic sulfonic acids such as 3,4-nitrochlorobenzenesulfonic acid, benzenesulfonic acid, p-toluenesulfonic acid, dl-camphorsulfonic acid, d-camphorsulfonic acid, β-naphthalenesulfonic acid, p-cymenesulfonic acid, 2,5-dichlorobenzenesulfonic acid, p-chlorobenzenesulfonic acid, p-nitrobenzenesulfonic acid, m-nitrobenzenesulfonic acid, 5-nitro-o-toluenesulfonic acid, 2,5-dibromobenzenesulfonic acid, 5-nitro-naphthalenesulfonic acid, 1,3-dimethylbenzene-4-sulfonic acid, 2,6-diiodiphenol-4-sulfonic acid, cyclohexanesulfonic acid, α-naphthalenesulfonic acid, dibutyl-1-naphthalenesulfonic acid, decylbenzenesulfonic acid, dodecylbenzenesulfonic acid, 3-nitro-p-toluenesulfonic acid, di-isopropyl-2-naphthalenesulfonic acid, etc.

However, the use of trichloroacetic acid is definitely preferred since it gives the best results and for all around performance is the most convenient to use.

Normally, the trichloroacetic acid or other strong organic acid is dissolved in the ketone in a amount of 7 to 9 parts of acid per 100 parts of ketone. The anhydrous ammonia is added in an amount just about enough to neutralize the solution. A large excess of ammonia increases the amount of contaminating ammonium carbonate and, hence, is not preferred.

The amount of acetone or other ketone employed is not critical but should be enough to dissolve substantially all the glutamine present. No advantage is obtained from using a large excess of ketone, although the use of an excess of ketone is not excluded. The ketone is generally used in an amount of 100 to 125 ml. per 100 ml. of beet juice from which the glutamine is obtained. The extraction of the dried beet juice with the acetonetrichloroacetic acid can be repeated two or more times and the extracts then combined prior to precipitation with ammonia.

Only a very small amount of methanolic calcium chloride is normally required to remove the amino acids from the glutamine. Thus, there can be used 3 to 5 ml. of the methanolic-calcium chloride on the ammonia precipitate per 100 ml. of original beet juice. The calcium chloride can be saturated or can be present in an amount of 3 to 5 parts per 100 ml. of the methanol.

The beet juice is preferably first decolorized with carbon black or activated carbon prior to evaporation to dryness. The evaporation can be carried out at room temperature and in any event a temperature above 40 to 50° C. should be avoided. The final amount of water can be bound by the addition of anhydrous sodium sulfate or other suitable water absorbent salt, e.g., calcium sulfate, etc. In this manner, there is obtained a granular product which can be finely ground. For most effective extraction of the glutamine, it is desirable that the dried product be in the finely powdered condition.

The time of extraction of the powder with the acetone-trichloroacetic acid is not particularly critical. Generally, 4 to 6 hours contact of the solvent mixture with the powder is sufficient for complete extraction. Over-night contact of the glutamine with the acetone-trichloroacetic acid does not reduce the yields obtained, but since trichloroacetic acid is gradually destroyed by amino acids, the time of extratcion should not be unduly prolonged.

The use of calcium chloride-methanol results in a slight loss of glutamine in the supernatant liquid, but its use in great measure frees the glutamine from contaminating amino acids.

The aqueous solution containing glutamine, e.g., beet juice, used as a starting material is preferably kept frozen until evaporation is started to minimize hydrolysis of the glutamine. Alternatively, the beet juice can be freshly prepared and the glutamine recovered by evaporation without freezing. The glutamine is stable in the acetone-trichloroacetic acid for the time required by the instant procedure.

The recrystallization is normally carried out in aqueous ethanol of 50 to 65% ethanol content by heating to 60 to 70° C. and then cooling to 5 to 10° C.

Unless otherwise stated, all parts and percentages are by weight.

*Example 1*

100 ml. of beet juice were decolorized by stirring for about 30 minutes at room temperature with carbon black and then filtered through hard paper on a Büchner funnel. The filtrate was light amber in color. It was then evaporated to dryness while maintaining the temperature below 50° C. When the mixture became a semi-solid mass, sufficient anhydrous sodium sulfate was added to bind most of the remaining moisture as water of crystallization and to convert the mixture to a granular condition. The mixture was then ground to a fine state in a mortar and allowed to stand over-night in a desiccator over concentrated sulfuric acid.

The finely ground material was stirred for about 6 hours with about 100 ml. of 0.5 N trichloroacetic acid in acetone. The supernatant fluid was decanted and the undissolved material washed with acetone and the washings were tested with ninhydrin. Since some amino acids remained undissolved, 25 ml. of the 0.5 N trichloroacetic acid in acetone were added to the undissolved material and the supernatant liquid again decanted and the undissolved material again washed with acetone. The combined extracts and washings were slowly neutralized with anhydrous ammonia in acetone. Care was taken to avoid a substantial excess of ammonia. A precipitate formed which comprised glutamine, amino acids present in the beet juice, ammonium carbonate and some non-volatile matter. The precipitate was allowed to settle and was filtered off. The precipitate was then stirred with about 3 ml. of methanol containing 5% calcium chloride. The supernatant liquid was neutral to a pH indicator. This methanolic-calcium chloride treatment dissolved the greater part of the amino acids and ammonium chloride and left as an undissolved residue most of the glutamine, and minor amounts of calcium carbonate and other impurities.

The undissolved material was packed by centrifugation and was washed with one or two drops of the methanolic-calcium chloride solution. The residue was then washed with a few milliliters of water. This washing was repeated until no more ninhydrin-positive substances were dissolved. The pH of the water extract was decidedly basic, and was adjusted to 7 with dilute HCl. The extract was evaporated to dryness at a temperature below 50° C. The dry solids were washed with a little methanol to remove remaining calcium chloride. The glutamine was then crystallized from 65% ethanol. Specifically, the glutamine was dissolved in 4 ml. of the 65% ethanol at 60° C. and recrystallized by cooling to 5 to 10° C.

A single crystallization gave a product which from its amide-N content was about 80% glutamine. It contained no ammonia. When chromatographed, only traces of contaminating amino acids were found. The contaminants were removed by recrystallization from 65% ethanol.

*Example 2*

Example 1 was repeated in duplicate using double quantities of all reagents, e.g., 200 ml. of beet juice were used as starting material in each case. To one of the 200 ml. samples was added 35 mg. of commercially obtained glutamine prior to going through the procedure and the other 200 ml. sample was used as a control. After following the procedure of Example 1, there was recovered 29 mg. more of glutamine based on the amide-N from the sample containing the added glutamine than from the control. This indicated a recovery of about 83% of the glutamine present.

We claim:
1. The method of separating glutamine from a dry mixture of glutamine and other amino acids derived from beet juice which comprises treating the dry mixture with a solution in a lower alkyl ketone of an organic acid from the group consisting of trichloroacetic acid and aromatic sulfonic acids forming a lower alkyl ketone-soluble compound with glutamine, separating from the undissolved material the liquid portion of the reaction mixture, adding ammonia to the liquid to neutralize the acid present and to form a precipitate containing glutamine, other amino acids and ammonium salts, separating the precipitate from the liquid and adding a mixture of calcium chloride in methanol to the precipitate to dissolve the amino acids other than glutamine and to dissolve the ammonium salts and recovering as the undissolved residue glutamine.

2. A process according to claim 1 wherein the organic acid is trichloroacetic acid.

3. A process of separating glutamine from a dry mixture of glutamine and other amino acids derived from beet juice which comprises treating the dry mixture with a solution in acetone of an organic acid from the group consisting of trichloroacetic acid and aromatic sulfonic acids forming an acetone-soluble compound with glutamine, separating from the undissolved material the liquid portion of the reaction mixture, adding ammonia to the liquid to neutralize the acid present and to form a precipitate containing glutamine, other amino acids and ammonium salts, separating the precipitate from the liquid and adding a mixture of calcium chloride in methanol to the precipitate to dissolve the amino acids other than glutamine and to dissolve the ammonium salts and recovering as the undissolved residue glutamine.

4. A process according to claim 3 wherein the organic acid is trichloroacetic acid.

5. A process according to claim 4 wherein the purified glutamine obtained is dissolved in aqueous ethanol and recrystallized therefrom to recover glutamine of still further purity.

6. The method of separating glutamine from a dry mixture of glutamine and other amino acids derived from beet juice which comprises treating the mixture with a solution in a lower alkyl ketone of an organic acid selected from the group consisting of trichloroacetic acid and aromatic sulfonic acids, separating from the undissolved material the liquid portion of the reaction mixture, neutralizing the acid present with ammonia to form a precipitate containing glutamine, other amino acids and ammonium salts, separating the precipitate from the liquid and adding a mixture of calcium chloride in methanol to the precipitate to dissolve the amino acids other than glutamine and to dissolve the ammonium salts and recovering as the undissolved residue glutamine.

References Cited in the file of this patent

UNITED STATES PATENTS

| | | |
|---|---|---|
| 2,681,927 | McCollum et al. | June 22, 1954 |
| 2,815,374 | McCollum | Dec. 3, 1957 |